A. FORSYTH & F. ZELENY.
BORING BAR.
APPLICATION FILED MAR. 15, 1913.
1,172,781. Patented Feb. 22, 1916.
2 SHEETS—SHEET 1.
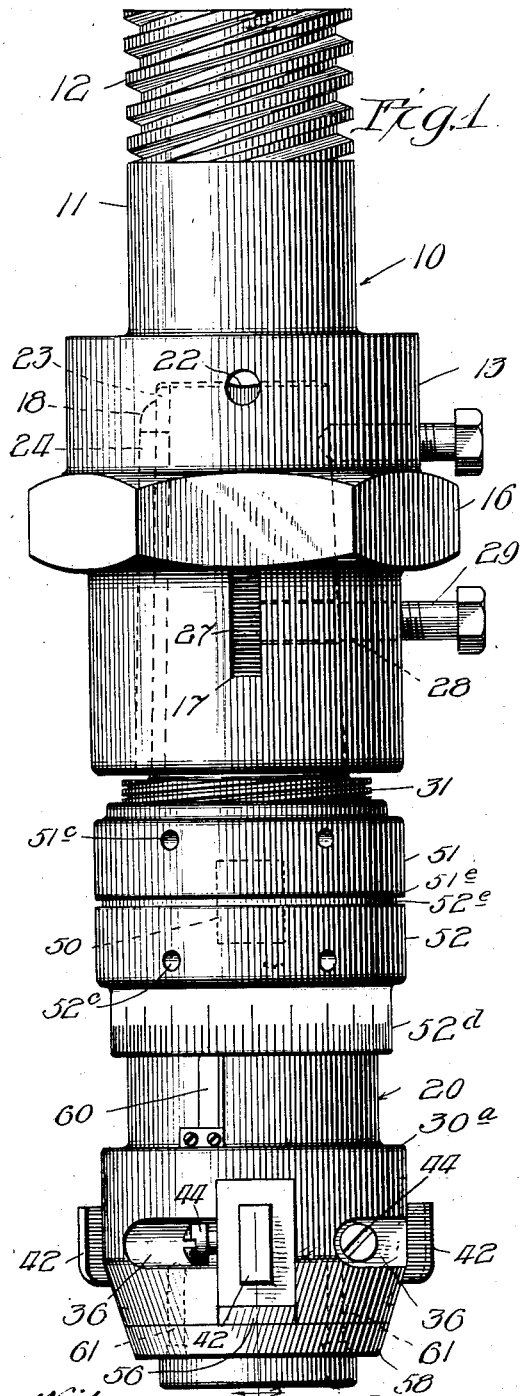
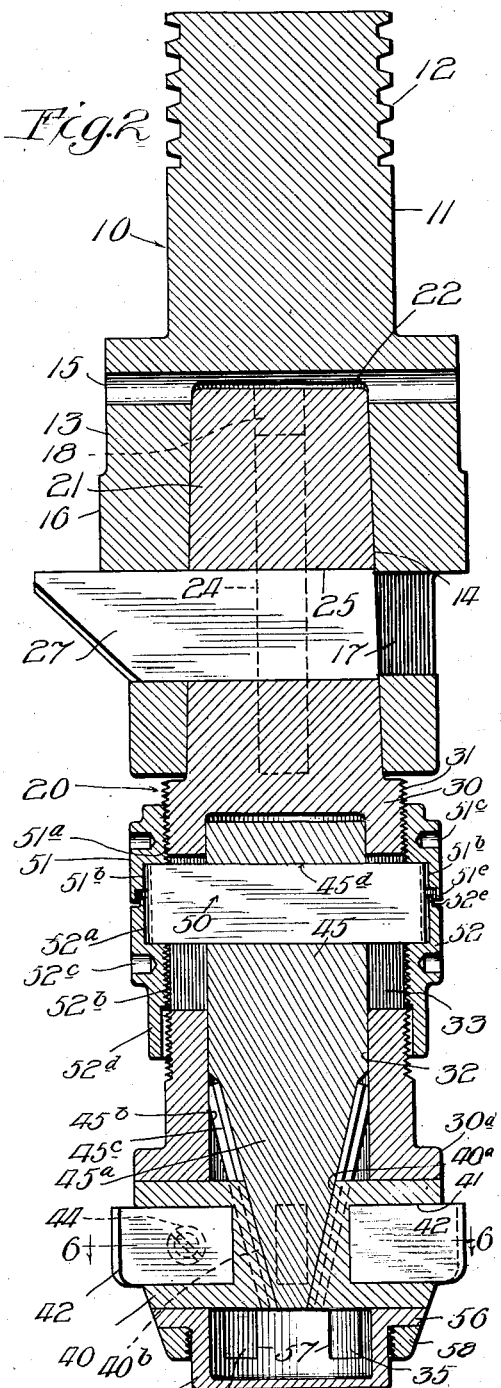

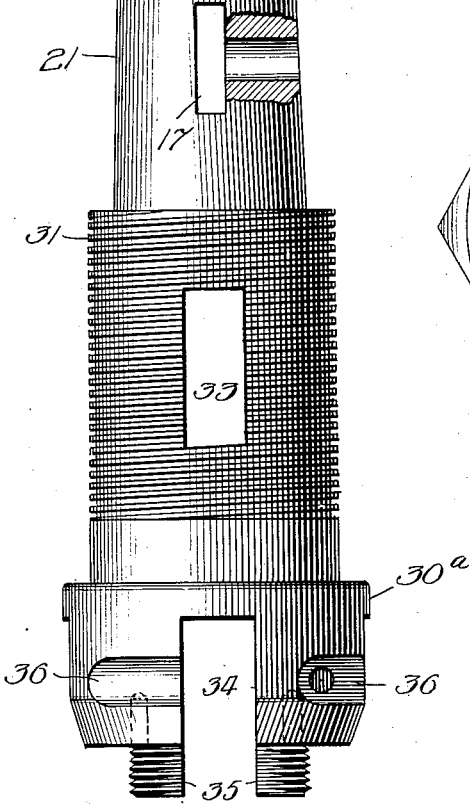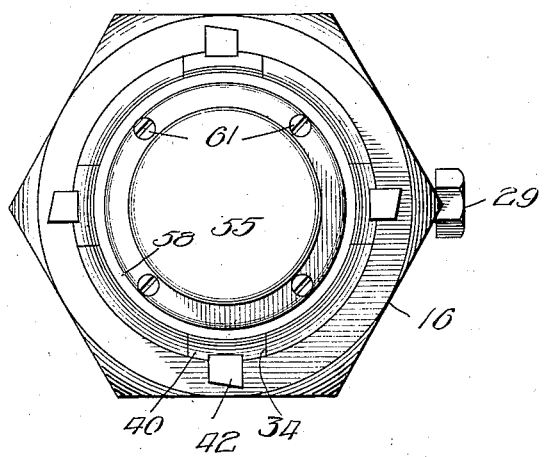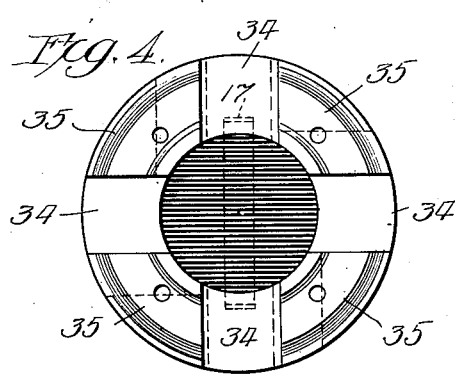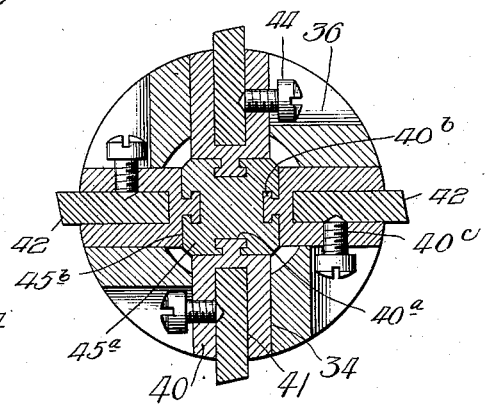

UNITED STATES PATENT OFFICE.

ALEXANDER FORSYTH AND FRANK ZELENY, OF AURORA, ILLINOIS.

BORING-BAR.

1,172,781. Specification of Letters Patent. Patented Feb. 22, 1916.

Application filed March 15, 1913. Serial No. 754,486.

*To all whom it may concern:*

Be it known that we, ALEXANDER FORSYTH and FRANK ZELENY, citizens of the United States, residing at Aurora, in the county of Kane and State of Illinois, have invented certain new and useful Improvements in Boring-Bars, of which the following is a specification.

Our invention relates to improvements in boring bars, and has for its object to provide an improved bar which will carry a plurality of boring cutters which may be accurately and readily adjusted simultaneously by the operator.

Another object is to provide a device of the class described in which a plurality of cutters may be adjusted simultaneously and maintained in adjusted position by the adjusting means.

Still another object is to provide a device of this class which may be readily assembled and disassembled.

Other objects will be made apparent and set forth in the following specification and accompanying drawings, in which—

Figure 1 is a side elevation of our invention. Fig. 2 is a longitudinal cross section along the line 2—2 of Fig. 1, the cutters and key being shown in elevation. Fig. 3 is a side elevation partially in section of the body member of our device. Fig. 4 is an inverted plan view of the body member shown in Fig. 3. Fig. 5 is an inverted plan view of the assembled device. Fig. 6 is a transverse section along the line 6—6 of Fig. 2.

Like numerals refer to like elements throughout the drawings, in which—

10 designates what we term the socket member, having the shank 11 threaded as indicated at 12, to engage the rotating bar of a boring mill, drill press, or the like. The socket member 10 is provided with the sleeve portion 13 having the socket 14 therein, preferably tapered as shown. A cross aperture 15 extends through the sleeve portion 13 across the upper portion of the socket 14, as shown in Fig. 2. The sleeve portion 13 is further provided with the shoulder 16, preferably formed of hexagonal contour for engagement by a wrench, etc. Located beneath this shoulder 16 is a cross aperture 17, extending through the sleeve portion 13. A longitudinal groove or key seat 18 extends along the inner periphery of the socket 14.

20 indicates generally what we term the tool-carrying member which has a stem or shank 21 tapered to closely fit the tapered aperture 14 and body member 10. The upper portion of the stem 21 projects partially into the aperture 15, and is partially dished or grooved as indicated by the numeral 22 at the top thereof, so that a drift-pin may be driven through the aperture 15 to force the tapered shank 21 out of position in the socket 14.

A longitudinal groove 23 indicated in dotted lines in Fig. 1 is located in the outer periphery of the shank 21 and is adapted to aline with the groove 18 in the socket 14. A key 24 is adapted to fit in the alined grooves 18 and 23 to prevent relative rotation of the shank 21 and sleeve portion 13. A cross aperture 25 extends transversely through the shank 21 and is adapted to aline with apertures 17 in the sleeve portion 13, one of said apertures being formed slightly smaller than the other.

A countersink or chamfering tool 27 may be inserted through the larger of openings 17 and through the aperture 25 to rest against the shoulders formed by the smaller of openings 17 in socket member 10. Extending partially through the sleeve portion 13 and shank 21 is the threaded aperture 28 in which is adapted to be inserted a set screw 29 which may be screwed in to bear against the side of the cutter 27 and hold the same seated in cutting position, as shown in Fig. 1. The tool-carrying member 20 below the shank 21 is formed with the body portion 30 externally threaded at 31, as shown in Fig. 2. This body portion 31 is provided with an internal socket 32. Extending through the walls of body portion 31 surrounding the socket 32, are slots 33, for a purpose to be hereinafter described.

Adjacent its lower portion the tool carrying member 20 is provided with the deep grooves 34 extending transversely therethrough and thereby forming four depending segmentary shoulders 35 (see Figs. 3 and 4). The tool-carrying member 20 is enlarged above its lower extremity and below the body portion 30, as shown in Fig. 3, and is decreased in size at its lower extremity, the depending portions 35 formed by the slots 34 being externally threaded as shown. Dished-out grooves 36 extend from the periphery of shoulder portion 30ª and are located at right angles to the slots 34, as shown in Fig. 3, for a purpose to be explained later.

Individual tool holders 40 closely fit in and are adapted to slide in the slots 34. These tool holders are substantially rectangular in cross section and are provided with the sockets 41 therein in which are adapted to be seated the cutters 42 closely fitting in the said socket. Each of the tool holders 40 is provided with the inclined rear face $40^a$ provided with the T-shoulder $40^b$ therein. These inclined rear faces of the tool holders 40 project into the socket 32 of body member 20 and are situated with their inclined faces converging toward the bottom of the boring bar, as shown in Fig. 2. Set screws 44, or the like, are located with their heads in the grooves 36 and are screw-threaded into threaded apertures $40^c$ in the tool holders 40, being adapted to be screwed thereinto to press against one side of the cutters 42 to retain the same seated in the holders 40.

An adjusting member 45 closely fits and is slidably mounted in the socket 32 of tool-carrying member 20. This adjusting member 45 is provided with its lower portion $45^a$ substantially pyramidal in form and is provided with a plurality of faces equal in number to the number of cutter holders. Each of these faces $45^b$ is provided with the T-slot $45^c$ therein adapted to closely fit around the T-shoulders $40^b$ of the cutter holders 40.

Adjacent the upper portion of adjusting member 45 is provided a transverse slot $45^d$ adapted to aline with the apertures 33 in sleeve portion 30 of the tool-carrying member 20. A gib or key 50 extends through and closely fits the aperture $45^d$ and has its extremities projecting through the apertures 33, the latter being of a width approximately equal to the width of the key 50 and of comparatively greater depth, whereby the key 50 may slide vertically in said slots 33, but rotation of said key will be prevented.

A collar 51 provided with the internally threaded portion $51^a$ engages the threaded portion 31 of the body member 20 at the upper portion thereof, and is provided with a peripheral groove or recess $51^b$ and also with the small sockets $51^c$ in the outer periphery thereof. A similar collar 52 is located below the collar 51, and is provided with a similar groove or recess $52^a$ alining with the corresponding groove $51^b$ of the collar 51 and internally threaded at $51^b$ to engage the threaded portion 31 of the body member 20. This collar 52 is similarly provided with small sockets $52^c$ therein, and is further provided with the downwardly extending peripheral flange $52^d$ below the threaded portion thereof adapted to closely fit around the portion of the body member between the lower extremity of the threaded portion 31 of the enlarged shoulder portion $30^a$ when the device is in outwardly adjusted position.

The collar 51 is provided with the downwardly extending flange $51^e$ at its lower portion fitting over and around the upwardly extending flange $52^e$ of collar 52. As is clearly shown in the drawings the extremities of the key 50 fit in corresponding pairs of sockets $51^b$, $52^a$, so that rotation of the two collars will occur when either is actuated, rotation of the collars serving to slide the key 50 in slots 33, whereby the adjusting member 45 will be reciprocated vertically in a corresponding direction. Vertical movement of the adjusting member 45, downwardly for instance, will result in a wedging action taking place between the pyramidal lower portion $45^a$ and the cutter holders 40, so that the latter will be forced outwardly to desired cutting position. When desired to retract the cutter holders and cutters a reverse rotation is imparted to the collars, and the adjusting member 45 will operate through the medium of the T-shoulder and slot connection to draw in the cutter holders as desired.

The flange $52^d$ is provided with graduations marked thereon, and an indicator 60 is secured therebeneath on the exterior of body portion 30 of tool-carrying member 20. This provides a means for measuring the adjustment of the cutters and tool-holders, the amount of rotation of the collars 51, 52, being indicated.

A protecting cap 55 located at the bottom of the boring bar is provided with the outwardly extending flange 56 and is slotted, or cut out, as indicated by numeral 57, to closely fit the depending segments 35 of the body member 20. The flange 56 fits closely against the inner side of the holders and is retained in position by the locking ring 58 internally threaded to engage the threaded segments 35 and to press against the under side of flange 56 to retain the same locked in position. Screws 61 may be utilized to hold ring 58 in place, as shown in Fig. 5.

In brief, the operation of our device is as follows: When boring out, for example, a car wheel, the cutter holders 40 are adjusted to cut the desired size hole, adjustment being made by inserting a pin or a spanner wrench in the socket $51^c$ or $52^c$, or both, the collars being rotated a sufficient amount to adjust the cutters to the desired position, said cutters being held in adjusted position by the collars, and the chamfering or countersinking cutter is adjusted manually to the position desired so that the same may operate to countersink or chamfer the edge of the aperture when cut. It is believed that the operation of our device is sufficiently clear from the above to obviate the necessity of further description.

It is to be noted that while the collars 51, 52, may be readily rotated in either direction to adjust the cutters and tool-holders, they will also remain in adjusted positions, the force applied to cutters and holders being incapable of rotating the collars from adjusted position, as will be apparent.

While we have shown our device with more or less particularity, we do not wish to be restricted to such showing beyond the scope of the appended claims.

What we claim is:

1. In a device of the class described, a tool carrying member, said tool carrying member being provided with a longitudinal socket and transverse grooves leading outwardly from said socket, tool holders mounted in said grooves and means to retain said tool holders in said grooves, said means comprising a cap having portions adapted to extend partially into said grooves and prevent vertical displacement therein of said tool holders.

2. In a device of the class described, a tool carrying member, said tool carrying member being provided with a longitudinal socket and transverse grooves leading outwardly from said socket, tool holders mounted in said grooves, means to retain said tool holders in said grooves, said means comprising a cap having portions adapted to extend partially into said grooves and prevent vertical displacement therein of said tool holders, and means to retain said cap in place.

3. In a device of the class described, a tool carrying member, said tool carrying member being provided with a longitudinal socket and transverse grooves leading outwardly from said socket, tool holders mounted in said grooves, and means to retain said tool holders in said grooves, said means comprising a cap having portions adapted to extend partially into said grooves and prevent vertical displacement therein of said tool holders, said cap and said tool carrying member adjacent said cap both being threaded and a retaining ring threaded on said cap and tool carrying member to retain said cap thereon.

4. In a device of the class described, a tool carrying member, said tool carrying member being provided with a longitudinal socket therein and transverse grooves adjacent one extremity thereof leading outwardly from said socket, tool holders slidably mounted in said grooves and having their rear faces projecting into said socket, means to adjust said tool holders inwardly and outwardly with respect to said tool carrying member, and means to retain said tool holders in said grooves, said last named means comprising a cap having portions adapted to extend partially into said grooves and prevent vertical displacement therein of said tool holders.

5. In a device of the class described, a tool-carrying member, said member being provided with a longitudinal socket and transverse slots communicating with said socket, said member being further provided with grooves adjacent the lower portion thereof, communicating with said socket, tool-holders mounted to move laterally in said grooves, an adjusting member slidably mounted in said socket and adapted to coact with said tool-holders to adjust the same laterally, a cross-key carried by said adjusting member, said key having its extremities extending through and slidably mounted in said slots, and a pair of collars threaded on the exterior of said tool-carrying member, said collars each having its adjacent flange inter-fitting and provided with a peripheral groove and forming together a common groove, said extremities of said key being seated in said common groove formed by the grooves in said collars, whereby rotation of said collars will operate to reciprocate said key in said transverse slots.

6. In a device of the class described, a tool-carrying member, said member being longitudinally socketed and provided with transverse slots leading therethrough from said socket, said member being further provided with grooves adjacent its lower portion leading from said socket, tool-holders slidably mounted in said grooves, means to retain said tool-holders in said grooves, said tool-holders being provided with inclined rear faces projecting into said socket and having T-shoulders formed on said faces, an adjusting member slidably mounted in said socket, and having a portion inclined to correspond and co-act with the inclined faces of said tool-holders, said inclined portion being provided with T-slots engaging said T-shoulders of said tool-holders, and slidably mounted in said slots means to reciprocate said adjusting member in said socket, whereby said tool-holders may be adjusted laterally with respect to said tool-carrying member.

In testimony whereof, we have subscribed our names.

ALEXANDER FORSYTH.
FRANK ZELENY.

Witnesses:
WILLIAM QUEENAN,
L. A. STOLL.